(12) United States Patent
Roth

(10) Patent No.: US 8,131,133 B2
(45) Date of Patent: Mar. 6, 2012

(54) SYSTEM AND METHOD FOR MODIFYING BROADCAST SIGNALS IN CLOSED CIRCUIT SYSTEMS

(76) Inventor: David A. Roth, West Bend, WI (US)

(*) Notice: Subject to any disclaimer, the term of this patent is extended or adjusted under 35 U.S.C. 154(b) by 1690 days.

(21) Appl. No.: 10/123,949

(22) Filed: Apr. 16, 2002

(65) Prior Publication Data

US 2003/0194199 A1    Oct. 16, 2003

(51) Int. Cl.
*H04N 9/80* (2006.01)
(52) U.S. Cl. ........ 386/249; 386/245; 386/250; 386/337; 386/212; 348/722; 358/908
(58) Field of Classification Search ........... 386/95, 386/46, 245, 250; 725/32, 34; 348/722; 358/908

See application file for complete search history.

(56) References Cited

U.S. PATENT DOCUMENTS 4,329,675 A    5/1982    Van Hull ............ 725/32

(Continued)

FOREIGN PATENT DOCUMENTS

EP    0735754 A2    10/1996

(Continued)

*Primary Examiner* — Thai Tran
*Assistant Examiner* — Girumsew Wendmagegn
(74) *Attorney, Agent, or Firm* — Ziolkowski Patent Solutions Group, SC

(57) ABSTRACT

A system and method are disclosed for modifying a television broadcast signal. In one embodiment, the system includes a memory that stores an alternate commercial signal, and a controller that is coupled to the memory and receives the broadcast signal. The broadcast signal includes a program signal and commercial signals. The controller substitutes the alternate commercial signal for one of the commercial signals upon determining that a first condition has been met, for example, upon the sensing two video/audio blank periods in the broadcast signal separated by a predetermined time period. In another embodiment, a broadcast signal including a series of screen signals alternating with a series of blanking signals is embedded, at an upstream location, with additional information relating to alternate commercials or commands during the blanking signals. At a downstream location, a controller processes the additional information and modifies the broadcast signal in response.

27 Claims, 6 Drawing Sheets

U.S. PATENT DOCUMENTS

| | | | |
|---|---|---|---|
| 4,331,974 A | 5/1982 | Cogswell et al. | 725/34 |
| 4,404,589 A | 9/1983 | Wright | 725/34 |
| 4,724,491 A | 2/1988 | Lambert | 386/1 |
| 4,733,301 A | 3/1988 | Wright | |
| 4,814,883 A | 3/1989 | Perine et al. | 725/36 |
| 4,931,871 A | 6/1990 | Kramer | |
| 4,945,412 A | 7/1990 | Kramer | |
| 4,974,085 A * | 11/1990 | Campbell et al. | 348/460 |
| 5,155,591 A | 10/1992 | Wachob | 725/35 |
| 5,200,825 A | 4/1993 | Perine | 348/722 |
| 5,233,423 A | 8/1993 | Jernigan et al. | 348/564 |
| 5,389,964 A | 2/1995 | Oberle et al. | |
| 5,412,416 A * | 5/1995 | Nemirofsky | 725/36 |
| 5,424,770 A | 6/1995 | Schmelzer et al. | 725/36 |
| 5,446,919 A * | 8/1995 | Wilkins | 725/35 |
| 5,515,098 A | 5/1996 | Carles | 725/35 |
| 5,600,366 A | 2/1997 | Schulman | 725/36 |
| 5,606,612 A * | 2/1997 | Griffin et al. | 380/217 |
| 5,661,516 A | 8/1997 | Carles | |
| 5,696,866 A * | 12/1997 | Iggulden et al. | 386/46 |
| 5,761,601 A | 6/1998 | Nemirofsky et al. | 725/34 |
| 5,774,170 A | 6/1998 | Hite et al. | |
| 5,815,671 A | 9/1998 | Morrison | 395/200.77 |
| 5,973,723 A | 10/1999 | DeLuca | 348/9 |
| 6,002,393 A | 12/1999 | Hite et al. | 345/327 |
| 6,005,602 A | 12/1999 | Matthews | 348/7 |
| 6,029,045 A * | 2/2000 | Picco et al. | 725/34 |
| 6,167,443 A | 12/2000 | Decker et al. | 709/219 |
| 6,172,712 B1 | 1/2001 | Beard | 348/552 |
| 6,425,127 B1 * | 7/2002 | Bates et al. | 725/32 |
| 6,487,721 B1 * | 11/2002 | Safadi | 725/36 |
| 6,698,020 B1 * | 2/2004 | Zigmond et al. | 725/34 |
| 6,944,877 B1 * | 9/2005 | Lord et al. | 725/32 |
| 2001/0039662 A1 * | 11/2001 | Sibley | 725/136 |

FOREIGN PATENT DOCUMENTS

| | | |
|---|---|---|
| EP | 1109407 A1 | 6/2001 |
| WO | WO 9807273 A1 | 2/1998 |
| WO | WO 9966719 A1 | 12/1999 |
| WO | WO 0007367 A2 | 2/2000 |
| WO | WO 0133848 A1 | 5/2001 |

\* cited by examiner

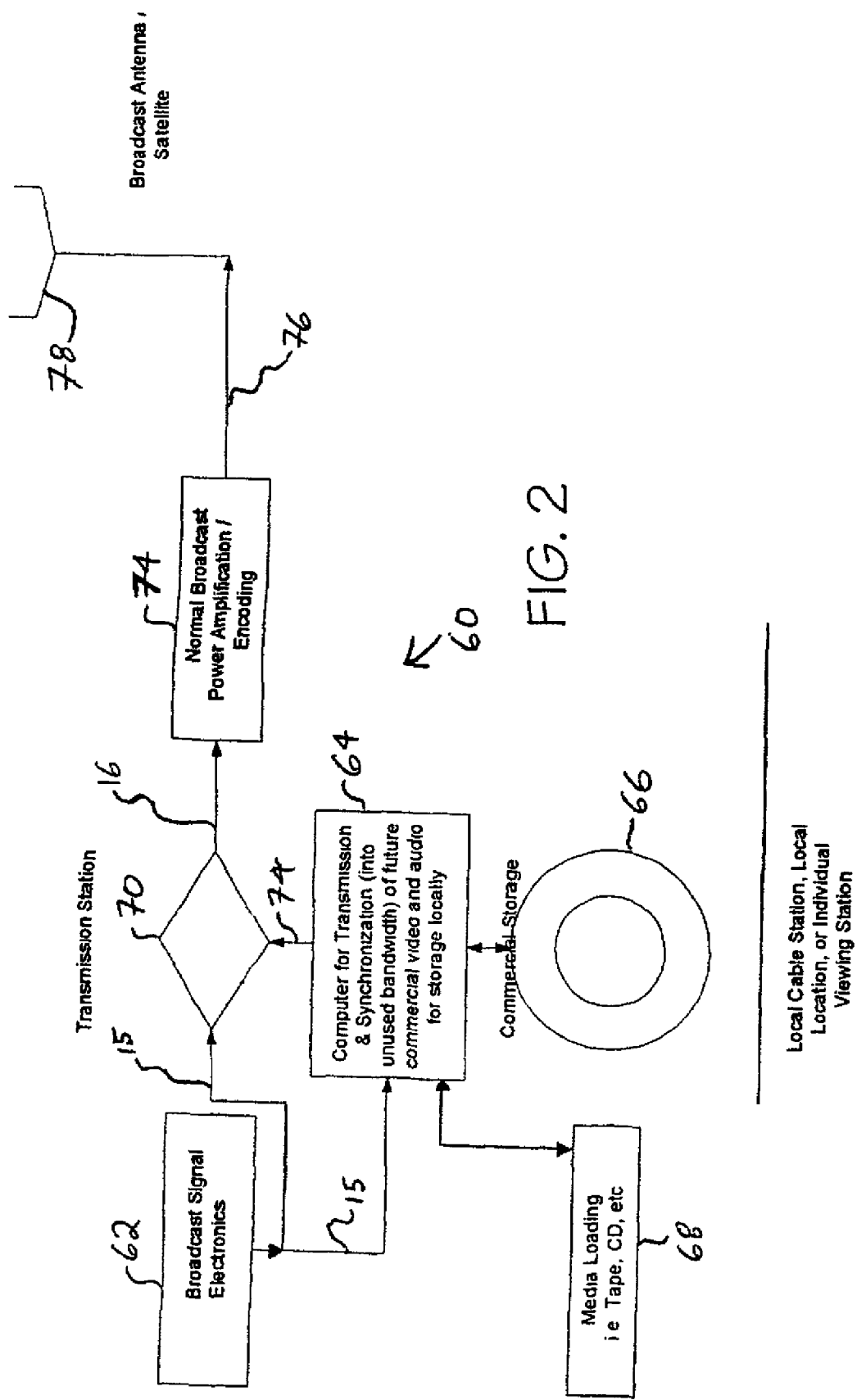

SYSTEM AND METHOD FOR MODIFYING BROADCAST SIGNALS IN CLOSED CIRCUIT SYSTEMS

FIELD OF THE INVENTION

The present invention relates to television and radio, and, in particular, relates to the generation and processing of broadcast signals that include both program signals and commercial signals.

BACKGROUND OF THE INVENTION

Television is ubiquitous in modern life. In addition to substantive programming, most television broadcasts also include commercial messages. These commercials are in most cases a necessary aspect of television broadcasts, since much of television broadcasters' revenue comes from the sponsors of those commercials.

In most cases, television broadcast signals alternate in time between providing television program signals and providing commercial signals. The commercial signals usually come in bursts of multiple commercial signals. That is, television program signals are usually not interrupted for only a single commercial signal, but rather are interrupted for at least two if not more different commercial signals.

The general (e.g., national) television audience contains many different audience segments, which can be defined based upon a variety of different criteria such as the location of the audience, the income of the audience, the interest of the audience, and the occupation of the audience, etc. While general television commercials intended for a national audience are regularly broadcast today, it would be preferable if commercials could be tailored to specific audience segments within the general television audience. This is because the commercials that most effectively influence a particular audience segment are those commercials that are targeted to that audience segment.

The ability to direct the broadcast of carefully tailored commercials to those audience segments for whom those commercials are tailored is desirable both for the sponsors of those commercials and for the broadcasters. From the commercial sponsors' perspective, the purchase of commercial advertising becomes a more worthwhile investment as the commercials become better directed at their intended audience segments. Additionally, from the broadcasters' perspective, the ability to broadcast commercials to more refined audience segments makes those commercial broadcasts more valuable overall, and thus more profitable.

One basis for differentiating audience segments is by geographic region. That is, while some sponsors of commercials wish their commercials to be directed to the general television audience nationally (or over a similarly large region), there are many other sponsors of commercials that wish their commercials to be directed only to a specific television audience located within a relatively small geographic region such as a city or county. Examples of the latter type of commercial sponsors include car dealerships and supermarkets.

This targeting of localized audiences with locally-tailored commercials is made possible today by the existence of local television stations around the nation. That is, local television stations receive national television broadcast signals from one of the national broadcasters. Within these national television broadcast signals are program signals alternating with series of commercial signals. Typically, within each series of commercial signals, there are one or more time slots at which the local television station can substitute a local commercial signal in place of a national commercial signal (or insert a local commercial signal within a time slot that otherwise would be blank time).

While such targeting of local audiences does allow commercial sponsors and television broadcasters to more effectively direct some commercials toward their intended audiences, this type of targeting leaves much to be desired. To begin with, the process by which local commercial signals are substituted in place of the national commercial signals forming part of the national television broadcast signals is difficult to perform and is expensive. In particular, even though the national broadcasters provide general scheduling information as to the times at which the local television stations should be able to substitute local commercial signals for the national commercial signals, this scheduling information is frequently inaccurate due to unexpected changes in what is being broadcast nationally. Thus, in order to substitute local commercial signals in place of national commercial signals, local television stations typically must employ a human operator who monitors the national television broadcast and manually switches on the local commercial signals in place of the national commercial signals at the appropriate times.

Further, even though local television stations covering cities or counties offer the ability to direct commercials intended for local audiences to those local audiences, this type of targeting is still quite unrefined insofar as there are many different and identifiable audience segments within any given local audience. It would be desirable if a system and method for broadcasting could be developed that allowed for even more localized control over the broadcasting of commercial signals, so that commercial signals could be more closely tailored to more narrow audience segments.

For example, many car dealerships, supermarkets, department stores and other stores, as well as many other public or semi-public areas such as airports, exercise facilities, or sports bars have multiple televisions or other video displays that are fed with television broadcast signals provided from the local television station (or even directly from a national broadcasting station). These multiple televisions often are positioned at different locations within these facilities. In such circumstances, it often would be desirable if the commercials being broadcast at these localized televisions were more closely tailored to relate to the specific audiences at those localized areas, or to a specific product which should be promoted in that localized area.

For example, in a supermarket it would be desirable to the supermarket owner if local commercials being displayed on a television near the meat and poultry section concerned the supermarket's current sales relating to meat products, while local commercials being displayed on a television near the fresh produce section concerned the supermarket's current sales relating to those goods. Similarly, in an airport, it would be desirable to merchants within the airport if televisions in a first airport terminal broadcast commercials promoting the purchase of food or periodicals at shops located in that first terminal, while televisions in a second airport terminal broadcast commercials promoting purchases at the shops located in that second terminal. And in a like fashion, in a sports bar, it would be desirable to the establishment to promote the establishment specials and/or to promote trips to sporting events.

Further, in many of these environments it would be desirable if the commercials being broadcast within those environments did not contravene other objectives of parties operating within those environments. For example, it would be desirable, for an airline operating at a particular gate of an airport, if a television at that gate broadcast commercials corresponding to the airline operating at that airport gate instead of commercials corresponding to a competing airline. Likewise, it would be desirable, for the owner of a store, if televisions within the store broadcast commercials promoting the store rather than one of its competitors.

One method of directing different commercials tailored for particular audience segments to those segments would simply involve providing numerous different individual television broadcast signals that were respectively tailored for each particular audience segment. Thus, for example, a food store with five televisions in five different food areas could be provided with five different television broadcast signals. While each of these broadcast signals might share the same main program content, the different broadcast signals could respectively include different commercials tailored for broadcast at the different areas within the store.

While this type of system might work in theory, in practice this type of system would be excessively costly to implement. In particular, such a system would require impractically-large amounts of bandwidth. Because of the impracticality of this type of system, and the existing need in the marketplace for improved targeting of advertisements to specific audience segments, it would be advantageous if another type of system and method could be developed that allowed for more refined control of television broadcast signals than is presently available so that commercials could be directed toward narrow audience segments other than those defined by the geographic scope of local television stations.

BRIEF SUMMARY OF THE INVENTION

The present inventor has realized that a narrow audience segment can be effectively targeted with commercials tailored specifically for that audience segment by modifying the television broadcast signals received from a national broadcaster, local television station, or other upstream source, just prior to those television broadcast signals being provided to a television or a grouping of several televisions. The television broadcast signals, which include program signals alternating with series of commercial signals, are modified by a control unit. In one embodiment, the control unit senses blank periods in between the program and commercial signals and in between pairs of commercial signals and, upon determining that a replaceable commercial signal is about to begin, substitutes an alternate commercial signal in place of that replaceable commercial signal. The alternate commercial signal can be provided from a memory unit coupled to the control unit, or from an alternate source.

Also, in other embodiments, command signals and/or information for alternate commercial signals can be provided to the control unit and/or the memory unit from an upstream source such as a national broadcaster. When provided from such an upstream source, the information for the command signals and/or alternate commercial signals is provided utilizing excess or unused bandwidth available in the normal broadcast signal. This could be accomplished in several ways, for example, by using the frame transition periods within the television broadcast signals. It should be noted that the terms "television signal" and/or "television broadcast signal" as used herein are intended to refer to any video and/or audio signals and messages, regardless of whether those signals/messages include program information, advertisements, or any other information. Specifically, in addition to signals intended for receipt and processing by a television, therefore, the terms "television signal" and/or "television broadcast signal" as used herein are intended to refer also to signals used in radio broadcasts, as well as cable, satellite, or other television-type systems that provide signals/messages including video and/or audio information such as motion pictures, graphics, computer generated images, pictures, or other visual information. A "normal television broadcast signal" or "normal signal" are defined as any signal upstream of the present invention.

The present invention relates to a system for modifying a first television broadcast signal to produce a modified television signal that is displayed by a video display unit upon being received by the video display unit. The system includes a memory unit that stores information corresponding to an alternate television commercial signal, and a control unit that is coupled to the memory unit and receives the first television broadcast signal. The first television broadcast signal includes at least, during a first time period, a television program signal and, during subsequent time periods, commercial signals. Upon a first condition being met, the control unit substitutes the alternate commercial signal based upon the stored information for at least one of the commercial signals to produce the modified television signal.

The present invention further relates to a system for modifying a first television broadcast signal to produce at least one modified television signal. The system includes a control unit; and a memory unit coupled to the control unit. In one embodiment, the control unit receives the first television broadcast signal, which includes a series of screen signals alternating with a series of blanking signals. The series of blanking signals include additional information relating to at least one of an alternate commercial signal and a command signal. The control unit processes the additional information and, if the additional information relates to the alternate commercial signal, stores the processed additional information in the memory unit. The control unit produces the modified television signal based upon the first television broadcast signal in response to the additional information.

The present invention additionally relates to a system for modifying a first television broadcast signal to allow for the display of locally-targeted commercial messages. The system includes a control unit, means for modifying the normal television broadcast signal, where the modifying means is coupled to the control unit, and a memory unit coupled to the control unit. In one embodiment, the control unit receives the normal television broadcast signal, which includes a series of screen signals alternating with a series of blanking periods. The control unit determines when the blanking periods are occurring, and provides control signals to the modifying means, the control signals including information concerning at least one of the locally-targeted commercial messages and command messages. The control signals cause the modifying means to embed the information into the first television broadcast signal during the blanking periods, so that the first television broadcast signal is modified to form a modified television broadcast signal having modified blanking periods.

The present invention further relates to a method of modifying a first television broadcast signal to produce a first modified television signal. The method includes receiving a first television broadcast signal from a broadcasting source, where the first television broadcast signal includes a plurality of information signals including a first program signal and at least two first commercial signals. In one embodiment, the method further includes monitoring for a first blank period within the first television broadcast signal, where the first blank period occurs between two of the information signals. The method additionally includes substituting a first alternate commercial signal for at least one of the first commercial signals to produce the first modified television signal, and outputting the first modified television signal.

The present invention additionally relates to a method of modifying a first television broadcast signal to produce a first modified television broadcast signal. The method includes receiving a first television broadcast signal from a broadcasting source, where the first television broadcast signal includes a plurality of information signals including a first program signal and at least two first commercial signals. In one embodiment, the method additionally includes receiving additional information during blanking periods within the normal television broadcast signal, where the additional information includes at least one of a command and information concerning a first alternate commercial signal. The method further includes substituting an alternate commercial signal for at least one of the first commercial signals to produce the first modified television broadcast signal, and outputting the first modified television broadcast signal for receipt by at least one video display.

The present invention further relates to a method of modifying a normal television broadcast signal to produce a first modified television broadcast signal embedded with additional information. In one embodiment, the method includes receiving at an upstream device a first television broadcast signal from a broadcasting source, where the first television broadcast signal includes a plurality of screen signals alternating with a plurality of blanking signals. The method further includes embedding additional information during the blanking periods within the first television broadcast signal to generate the first modified television broadcast signal, where the additional information includes at least one of a command and information concerning a first alternate commercial signal. The method additionally includes outputting at least one of the first modified television broadcast signal and a signal based upon the first modified television broadcast signal for receipt by a downstream device.

BRIEF DESCRIPTION OF THE DRAWINGS

FIG. 2 is a schematic block diagram showing an exemplary system for generating a television broadcast signal having additional commercial and/or command information embedded within transition periods within the signal;

DETAILED DESCRIPTION OF THE PREFERRED EMBODIMENT

Figure 1A:
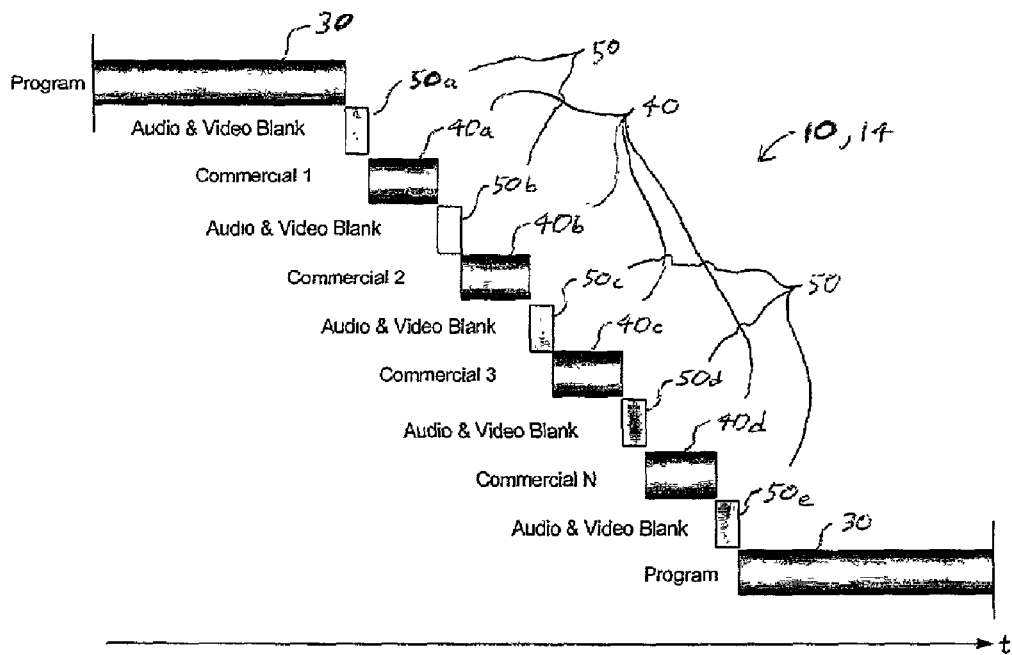
FIGS. 1A and 1B are timing diagrams showing, in schematic form, Prior Art aspects of exemplary television broadcast signals.
Figure 1B:
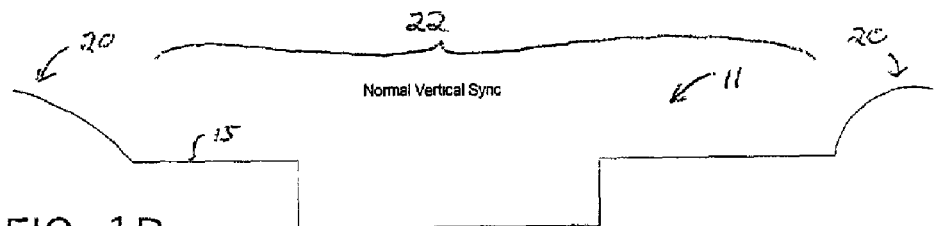
Figure 1C:
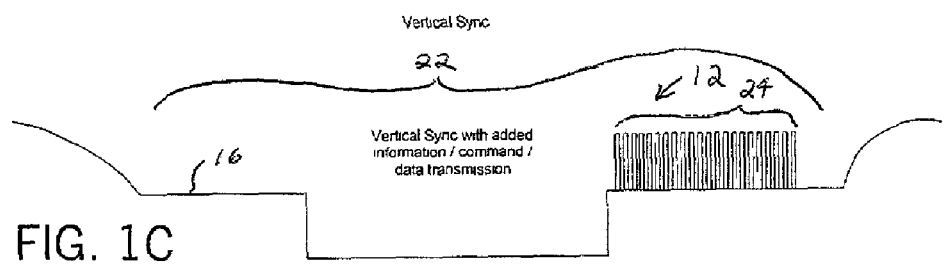
FIG. 1C is a timing diagram showing, in schematic form, a modified television broadcast signal incorporating additional information.

Referring to FIGS. 1A and 1B, timing diagrams 10 and 11 are provided to show exemplary aspects of conventional (Prior Art) television broadcast signals 14,15 in simplified form, respectively. Additionally, FIG. 1C provides a timing diagram 12 of a modified television broadcast signal 16 that includes additional information in comparison with the television broadcast signal 15 of FIG. 1B. As shown in FIG. 1A, the television broadcast signals 14 on a higher level typically consist of a series television program signals 30 that alternate in time with a series of commercial signals 40. While the commercial signals 40 that follow any given television program signal 30 can be limited to a single commercial signal (e.g., for a single advertisement), typically several commercial signals such as commercial signals 40a, 40b, 40c and 40d follow any given television program signal, and in turn are followed by another television program signal. In between each of the television program signals 30 and the commercial signals 40 (e.g., between the first television program signal shown in FIG. 1A and commercial signal 40a), and further in between each of the respective successive commercial signals (e.g., between the commercial signals 40a and 40b, between signals 40b and 40c and between signals 40c and 40d), there are detectable events, such as video and audio blank periods 50 in which the television broadcast signals 14 take on a black or otherwise default or neutral state, in which no video or audio information is provided. Specifically in the timing diagram 10, five such blank periods 50a, 50b, 50c, 50d and 50e are shown. Of course, these detectable events can be any event, such as a predetermined cueing signal and/or command signal which can be electronically detected by devices known in the art, without departing from the scope of the invention.

Referring to FIG. 1B, the timing diagram 11 shows additional features of conventional television broadcast signals 15. As shown, the television broadcast signals 15 include a series of information or screen signals or periods 20 that alternate with a series of transition or vertical blanking (or simply blanking) periods 22. During the screen periods 20, information used for display is transmitted. However, during the blanking periods 22 of the conventional television signals 12, no information is provided. The blanking periods 22 are typically the times at which an electron beam within a television that is receiving the broadcast signals is reset to an initial position.

The television broadcast signals 14, 15 having the aspects shown in FIGS. 1A and 1B are configured in accordance with the NTSC or other standards. While other television broadcast signals in accordance with other standards (e.g., in Asia) can differ in terms of their timing features or other characteristics (e.g., digital or analog) from those in accordance with the NTSC standard, the television broadcast signals in accordance with all (or virtually all) of these other standards share some of the features of the television broadcast signals 14,15. In particular, all (or virtually all) television broadcast signals, regardless of their standard, include blank periods 50 such as those shown in FIG. 1A, which separate commercial signals from program signals and from one another. Additionally, all (or virtually all) television broadcast signals, regardless of their standard, include periods of time in which little or no information is being transmitted such as the blanking periods 22 of FIG. 1B. While such blanking periods may not always be vertical blanking periods relating to the readjustment of electron beams within televisions, such blanking periods nevertheless exist. These blanking and blank periods constitute periods of excess or unused bandwidth within the television broadcast signals.

Figure 3:
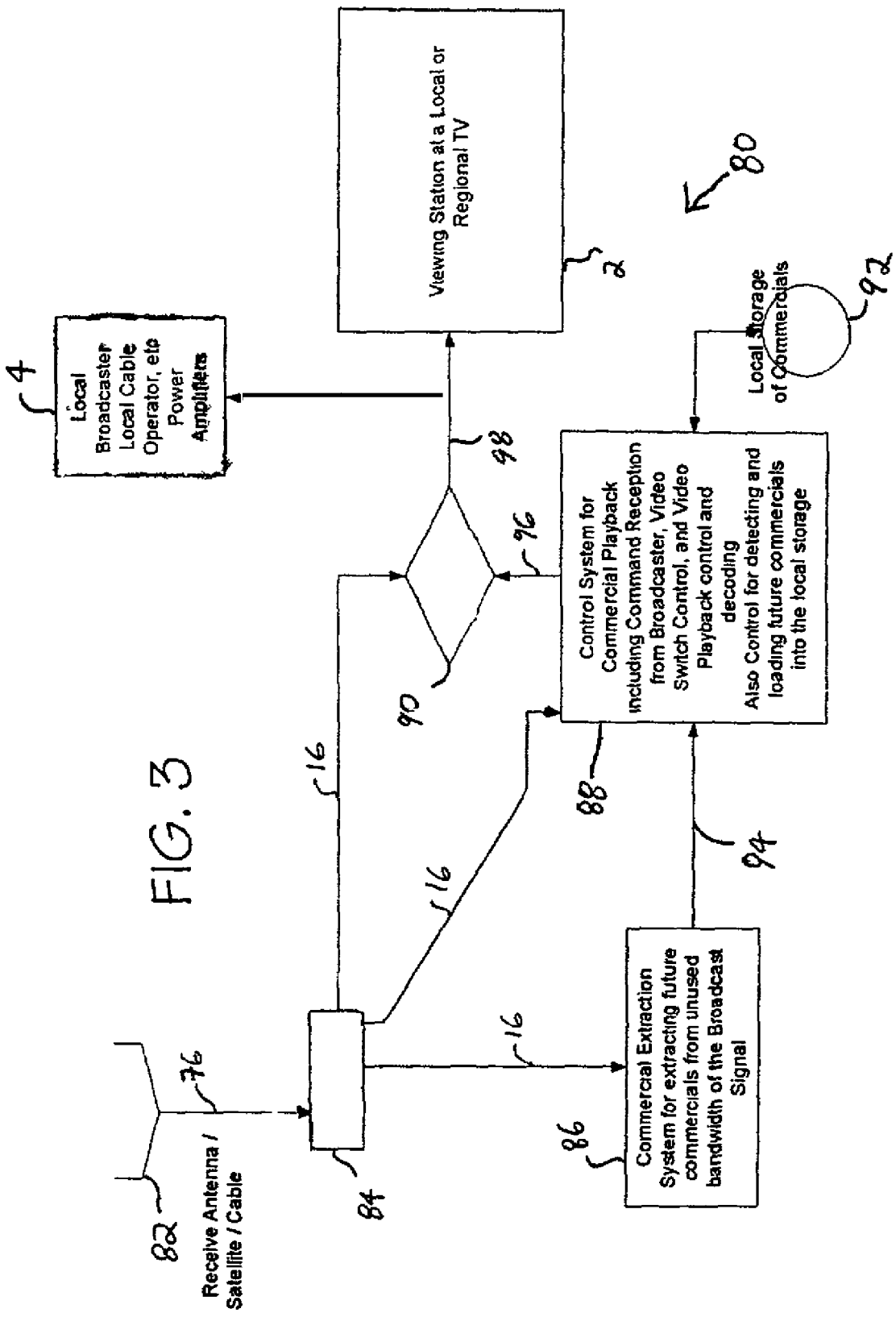
FIG. 3 is a schematic block diagram showing an exemplary system which is capable of receiving the television broadcast signal of FIG. 2 and extracting and utilizing the embedded information.

Turning to FIGS. 2 and 3, components of a system that allows for an upstream broadcaster to exercise greater control over what is broadcast by downstream broadcast facilities, particularly in terms of the commercials that are displayed by those downstream broadcast facilities, are shown. FIG. 2 in particular shows an upstream system 60 that allows for an upstream broadcaster such as a national (or even international) broadcast network to embed additional information within a television broadcast signal that can in turn be received and utilized by a downstream facility 80 (see FIG. 3). The embedded information is embedded into the television broadcast signals 15 during the blanking periods 22 discussed with respect to FIG. 1B, or during any other time when excess/unused bandwidth is available within those television broadcast signals (or other television broadcast signals). Upon the embedding of this information into the blanking periods 22, the television broadcast signal 15 become modified television broadcast signals 16 in which the blanking periods 22 are no longer empty of information, as shown in FIG. 1C. In particular, in the embodiment shown in FIG. 1C, portions 24 of the blanking periods 22 now include additional information. In the embodiment shown, the portions 24 correspond to the last ten horizontal lines of the blanking periods 22 (as typically exist within television broadcast signals in the United States and in Europe). Embedding of the information within these portions 24 is the simplest and most cost-effective manner of embedding the information. However, as discussed above, in alternate embodiments, information can be added to any portion of the television broadcast signals 15 at which there is excess/unused bandwidth.

As shown with respect to FIG. 2, the upstream system 60 is provided with the television broadcast signals 15 from a typical television broadcast signal equipment 62 of the broadcaster. A processor 64 within the system 60, such as a computer, a microprocessor or other processing device, receives the television broadcast signals 15 and determines when the blanking periods 22 occur. The processor 64 is in communication with a memory device 66 and an input/output device 68, from which it is able to retrieve the additional information that is to be embedded within the television broadcast signal 15. As shown, the input/output device 68 can be a tape player, a CD/DVD player, or any of a variety of other devices relating to a variety of other media, and often will be delivered to the upstream system by way of service personnel, by the internet, by phone line(s), or in other ways. Regardless of where the additional information to be embedded within the television broadcast signals 15 comes from, the processor 64 is able to obtain such information from the devices 66 or 68 and, upon determining when the blanking periods 22 are occurring, is able to synchronize the embedding of such information to generate the modified television broadcast signal 16.

The processor 64 controls the embedding process by providing control signals 74 to a signal processing device 70 that modifies the television broadcast signal 15 to produce the modified television broadcast signal 16. The signal processing device 70 can be any of a variety of different types of mixing, multiplexing, memory, switching or synchronization devices implemented in either hardware or software that allow for the substitution of one television signal for another or otherwise allow for the modification of a signal. Depending upon the embodiment, the signal processing device 70 can be configured for operation upon digital or analog signals. The modified television broadcast signal 16 thus includes, during its blanking periods 22, additional information (e.g., during the portions 24). Once the modified television broadcast signal 16 is produced, the signal is provided to standard signal processing devices 74 that amplify, encode, compress or otherwise further process the modified television broadcast signal 16 to produce a transmission signal 76 that is provided to a transmission device 78. The transmission device 78 can be any of a television broadcast antenna, a satellite link, a cable transmission station, or any of a variety of other transmission devices that allow for transmission of the transmission signal 76 over various transmission media.

Referring to FIG. 3, the downstream system 80 at a downstream location such as a local television broadcasting facility or a local television network receives the transmission signal 76 at a receiving device 82. The receiving device 82 can be any of a number of different types of receiving devices, including antennas, satellite dishes, and cable receiving devices. The transmission signal 76 is first processed at an initial signal processing device 84, which can perform a variety of signal processing functions, such as deamplification or amplification, decoding of the transmission signal, and decompressing of the transmission signal. The output of the processing device 84 in turn is the modified television broadcast signal 16, or a similar signal carrying all of the same information as the modified television broadcast system 16 discussed with respect to FIG. 2. The modified television broadcast signal 16 is provided both to an information extraction device 86 and to a signal processing device 90. The signal processing device 90 can be any of a variety of different types of mixing, multiplexing, memory, switching or synchronization devices implemented in either hardware or software that allow for the substitution of one television signal for another or otherwise allow for the modification of a signal. Depending upon the embodiment, the signal processing device 90 can be configured for operation upon digital or analog signals.

The information extraction device 86 extracts, from the modified television broadcast signal 16, the embedded information that was introduced into that signal by way of the processor 64 and the signal processing device 70. That is, the information extraction device 86 extracts embedded information concerning commercials and/or commands for the system 80. The extraction information device 86 is able to determine the appropriate information for extraction either by determining when the blanking periods 22 are occurring and extracting information during those periods, or by detecting tags or other indicators in the modified television broadcast signal that indicate when the embedded information is beginning or ending. Extraction of the embedded information by the device 86, in the present embodiment, does not affect the modified television broadcast signal 16 that is provided to the signal processing device 90.

The information extracted by the information extraction device 86 is provided in the form of an extracted information signal 94 to a controller 88 that in the present embodiment is in communication with a memory device 92. Each of the controller 88 and the information extraction device 86 can be computers, microprocessors, or other processing devices and technologies (including state machines) and, while the two devices are shown to be separate in FIG. 3, in alternate embodiments the two devices can be comprised within a single processing component. The controller 88 analyzes the extracted information signal 94, which can contain any of alternate commercial information, commands (including, for example, algorithms, timing plans, and control system instructions or identification information), or other information which may be useful to a downstream device, such as the number of following commercials, the sequence and length of each following commercial, which of the following commercials can be substituted with an alternate commercial, which alternate commercial(s) to use, and the like. Based upon the information in that signal, the controller 88 determines whether the information should be stored in the memory device 92, whether additional information from the memory device should be imported into the controller 88, and whether and when the controller 88 should provide control signals 96 to the signal processing device 90. For example, if the information in the extracted information signal 94 concerns an alternate commercial that should be played by the downstream system 80 at a particular time, the controller 88 in response to receiving such information will store the information in the memory device 92. Then, upon determining that the appropriate time is about to occur at which that alternate commercial should be broadcast, the controller 88 obtains the stored information concerning the alternate commercial from the memory device 92 and provides control signals 96 to the signal processing device 90 causing the modified television broadcast signal 16 to be further modified to include that commercial. As shown, in certain embodiments, the modified television broadcast signal 16 is also provided directly from the initial signal processing device 84 to the controller 88.

Typically, the controller 88 will substitute an alternate commercial signal based upon the alternate commercial information in place of an existing commercial signal within the modified television broadcast signal 16, and thus produce an additionally modified television signal 98. The additionally modified television signal 98, depending upon the embodiment, can be provided directly to a television set 2, or to a local network providing signals to a group of television sets, or to an alternate (further downstream) broadcast station such as a local broadcaster, a local cable operator or other facility, which further transmits the additionally modified television broadcast signal or signals based thereupon to television sets, groups of television sets, or other downstream broadcasters (shown collectively in FIG. 3 as element 4). That is, the present system as described with reference to FIGS. 2 and 3 is not meant to be limited to embodiments in which the upstream system 60 is at the national broadcaster and the downstream system 80 is at a local broadcaster. Rather, the upstream system 60 can be at any broadcasting location that is upstream from at least a lowest-level location governing an actual displayed output by one or more television sets, while the downstream system 80 can be any broadcasting (or signal processing location) that is downstream from an upstream location in which information is embedded into the blanking periods 22 of the television broadcast signals 12.

The information received by the controller 88 in the form of the extracted information signal 94 can also include one or more commands that have been embedded within the modified television broadcast signal 16. These commands can vary in terms of their purpose. For example, certain commands provide instructions to the controller 88 as to when a particular alternate commercial signal can be substituted for an existing commercial signal within the modified television broadcast signal 16 by way of the signal processing device 90. Also, the commands can instruct the controller 88 to access prerecorded information within the memory device 92 and utilize that information in generating the additionally modified television signal 98. Further, the commands in the extracted information signal 94 can instruct the controller 88 to cause certain previously-received commercial information to be deleted from the memory device 92. Or, the extracted information signal 94 can include other types of instructions relating to the processing of the modified television broadcast signal 16, the times at which different alternate commercial signals should be substituted into the same time slots of the modified television broadcast signal depending on the day, and other information.

The controller 88, in addition to determining the operation of the signaling processing device 90 by way of the control signals 96, and controlling the operation of the memory device 92 in terms of whether information is written to that device or read from that device, also is capable of encoding, decoding (e.g., for security), compressing and decompressing various information. For example, the extracted information signal 94 is typically still in a compressed format when provided to the controller 88, which in turn must decompress that information.

As discussed above, the upstream and downstream system 60, 80 of FIGS. 2 and 3 can be implemented in a variety of circumstances. Further, it is to be understood that any given upstream system 60 can be in communication with (that is, provide the same modified television broadcast signal 16 to) any number of downstream systems 80. Likewise, it is possible that a given downstream system 80 will still receive signals from multiple upstream systems. In one case, the upstream system 60 is located at a national broadcasting facility, while multiple downstream systems 80 are located at multiple local broadcasting stations throughout the country. Usage of the upstream and downstream systems 60, 80 allows the national broadcaster to send to the respective local broadcasting stations information concerning different commercials that are respectively targeted for the respective local areas served by those local stations. The information concerning the different commercials is embedded into the modified television broadcast signal 16 (and thus the transmission signal 76) that is provided to all of the local broadcasting stations.

Because the multiple downstream systems 80 are in communication with the same upstream system 60, and receive the same modified television broadcast signal 16 containing the same embedded information, each of the downstream systems 80 can potentially receive embedded information concerning multiple alternate commercial signals, each of which may properly pertain to only one of the local broadcasting systems. In order for the respective downstream systems 80 to determine which portions of the embedded information properly pertain to the respective local broadcasting stations, the embedded information in certain embodiments will include markers or tags that specify the particular local broadcasting stations that are supposed to make use of the particular information. The respective downstream systems 80 of the respective local broadcasting stations, either by way of their information extraction devices 86, their controllers 88, or other systems/components in turn are programmed to recognize the appropriate markers or tags indicative of whether particular embedded information is to be utilized by the respective downstream systems.

In alternate embodiments, the upstream system 60 provides commands as part of the embedded information within the transmission signal 76. The downstream systems 80 of the respective local broadcasting stations in turn are able to recognize and respond to the commands and, based upon the commands, determine whether the respective downstream systems 80 are to utilize particular information embedded in the transmission signal 76. Also, as discussed above, the present invention can, in a variety of alternate embodiments, receive, transmit and otherwise operate in relation to a variety of different types of television broadcast signals of different formats, including signals containing video or audio information that are to be communicated by any of a variety of different media in addition to typical television broadcasting systems, such as digital (or analog) satellite television broadcasting systems, cable television broadcasting systems, radio, etc. That is, the present invention is intended to cover all types of broadcast signals over any type of media in which there is excess/unused bandwidth that can be used to send additional command or commercial information.

The overall system of FIGS. 2 and 3 gives a national broadcaster great control over the particular commercials and other information (even television program information) broadcast by local broadcasting stations. The control over the local broadcasting stations can be exercised automatically and without being dependent upon human intervention at the local broadcasting stations. Although the additional information embedded into the modified television broadcast signal 16 is confined to the portions 24 of the blanking periods 22 within that signal, such portions provide adequate bandwidth and time span within which to transmit many different potential substitute commercial signals to a variety of local broadcasting stations as well as commands to those broadcasting stations. For example, assuming the use of minimal data compression, it is possible to send updated commands and a complete thirty second commercial in less than fifteen minutes using the excess bandwidth of the television broadcast signal 15. If information continued to be sent at this rate during an entire day, information corresponding to approximately 100 commercial signals could be broadcast during the otherwise unused time associated with the blanking periods 22 over the course of the single day. Thus, the national broadcaster could provide new updated local commercials to over 100 different downstream systems 80 at corresponding local broadcasting stations throughout the country during a single day. Using more sophisticated data compression techniques existing in the art, it is known that the number of commercial signals that could be provided in this way to different local broadcasting stations could be further increased.

In alternate embodiments, the upstream system 60 could also be a local broadcasting station, with the downstream systems 80 being respective additional stations or even individual control units associated with individual television sets (or similar display devices) in communication with those local broadcasting stations. In such embodiments, a given local broadcasting station could determine the commercials that specific television sets within its region are displaying, as well as provide other commands to the downstream systems 80 governing those televisions. In further embodiments, the upstream system 60 could be a national broadcaster, while the downstream systems 80 could be associated with specific television sets or local networks within limited areas such as airports, or even specific terminals or gates within airports. Thus, the national broadcaster could provide a specific commercial (e.g., a commercial concerning Airline #1) to a first downstream system 80 governing a first set of television monitors within a first terminal of an airport that served a particular airline (e.g., Airline #1), while a different commercial could be provided to a second downstream system 80 governing a different set of television sets within a different terminal at that same airport in which a different airline (e.g., Airline #2) was the predominant carrier. Both of these differing commercials could be displayed at their respective gates at the exact same time. The systems 60, 80 therefore give the upstream broadcaster the ability to offer to its advertising customers highly-targeted slots for their commercials, and allows them to segment the commercials to generate greater total revenue by matching the ads to the audience most likely to purchase.

Figure 4:
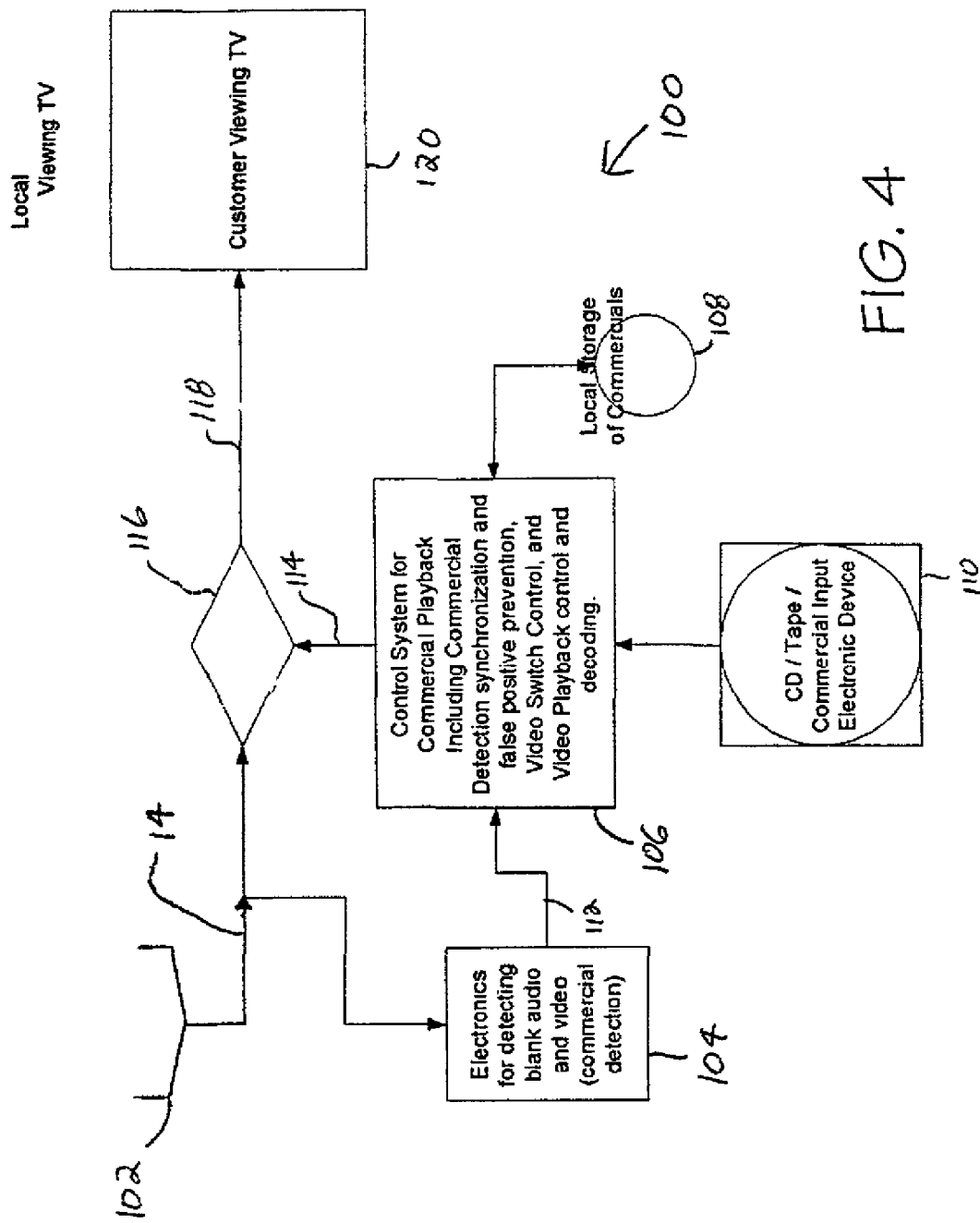
FIG. 4 is a schematic block diagram showing an exemplary system which is capable of detecting commercial signals within a television broadcast signal and further capable of substituting alternate commercial signals in place of the original commercial signals to generate a modified television broadcast signal.

Referring to FIG. 4, an additional downstream system 100 is shown that allows for the local substitution of alternate commercial signals in place of existing commercial signals within a television broadcast signal. As shown, the system 100 receives the television broadcast signal 14 at a receiving device 102, which can be an antenna, a satellite dish, or simply a cable or other wire connection. The television broadcast signal 14 as discussed above includes a series of television program signals 30 that alternate with commercial signals 40. In between successive commercial signals, as well as in between the commercial signals and the television program signals, are the video and audio blank periods 50 during which both the video and audio information is "black" or at a default or neutral state. The system 100 monitors the television broadcast signal 14 using a detection device 104, which detects the blank periods 50. Further, the system 100 includes a controller 106, which is in communication with a memory device 108 and input/output device 110 such as a CD/DVD player, a tape player, an internet connection (or server), a phone line, a network, or another input/output device. The controller 106 monitors the detection signals 112 provided by the detection device 104 that are indicative of the blank periods 50.

Using the information concerning the occurrences of the video and audio blank periods 50, the controller 106 then determines, based upon its programming or upon information stored in the memory device 108 or received by way of the input/output device 110, whether to provide control signals 114 to a signal processing device 116 in order to substitute an alternate commercial signal for an existing commercial signal to produce a modified television signal 118. The signal processing device 116 can be any of a variety of different types of mixing, multiplexing, memory, switching or synchronization devices implemented in either hardware or software that allow for the substitution of one television signal for another or otherwise allow for the modification of a signal. Depending upon the embodiment, the signal processing device 116 can be configured for operation upon digital or analog signals. By virtue of the operation of the switching device 116 as controlled by the controller 106, the modified television signal 118 contains one or more alternate commercial signals in place of the original commercial signals within the television broadcast signal 14. Thus, when this modified television signal 118 is provided to one or more television sets or other displays 120, specialized commercials are displayed along with the normal television program (and other commercials for which there have been no substitutions).

The detection of one of the video and audio blank periods 50 is almost always an indication that a transition is occurring either between one of the television program signals 30 and one of the commercial signals 40 (or vice-versa), or between two successive commercial signals. However, typically, the simple detection of one of the blank periods 50 is not sufficient information to guarantee that the signal occurring after the blank period will in fact be a commercial signal. Because it is important for the purposes of the system 100 that a commercial signal not be substituted in place of a regularly scheduled television program signal, the system in one embodiment operates to determine the occurrence of multiple blank periods 50, rather than just single blank periods, in order to determine appropriate times for the substitution of alternate commercial signals. Specifically, in this embodiment, the controller 106 determines that the television broadcast signal 14 is broadcasting a series of commercial signals 40 rather than a television program signal 30 when the detection device 104 detects a first blank period 50*a* and then detects a second or subsequent video and audio blank period 50*b* that occurs a predetermined period of time after the occurrence of the first blank period (see FIG. 1A) The controller 106 is able to detect a series of commercial signals in this manner because, in conventional television broadcasting, the commercial signals 40 always last certain discreet periods of time, namely 10, 15, 20, 30 or 60 seconds. Thus, if the second blank period 50b occurs 10, 15, 20, 30 or 60 seconds after the first blank period 50a, then it is nearly certain that the television broadcast signal 14 at this time is broadcasting a series of commercial signals rather than a television program signal.

This manner of detecting commercial signals depends upon there always being at least more than one commercial signal in between any given two television program signals. However, because it is only under rare circumstances that television broadcast signals include only a single commercial signal in between two television program signals, it is a safe assumption that, upon detecting a second blank period, the television broadcast signal will then be broadcasting a second commercial signal. Therefore, it is reasonable for the controller 106 to control the signal processing device 116 to substitute an alternate commercial signal in place of the second or later commercial signals following the second blank period 50b.

In alternate embodiments, the controller 106 includes a bank of memory acting as a buffer. The buffer is capable of storing the television broadcast signal 14 for a period of time prior to the relaying of that signal or modifying of that signal by the controller 106/switching device 116. Although the modified television signal 118 is temporally delayed with respect to the television broadcast signal 14, the buffering of the signal provides the controller 106 with time to analyze the television broadcast signal prior to modifying or outputting that signal. Consequently, the controller 106 is able to determine, by monitoring the television broadcast signal 14, whether it is a television program signal or a commercial signal that is currently being transmitted. Indeed, the controller 106 is also able to determine whether it is currently the first, second, third, etc. commercial signal of a series of commercial signals that is being transmitted. Because of this greater monitoring capability, the controller 106 is capable of determining that a first commercial signal is about to air and substituting an alternate commercial signal in place of that first commercial signal, and is not limited to only substituting alternate commercial signals in place of the second or later commercial signals in a series of commercial signals. Additionally, the controller 106 is able to exactly synchronize the substitution of alternate commercial signals for original commercial signals within the television broadcast signal 14, even in the cases where the original commercial signals are of nonstandard lengths (e.g., seven second commercials).

The downstream system 100 of FIG. 4 allows for localized control of commercials. Such localized control potentially is desirable in a variety of circumstances in which television monitors are being operated in specialized surroundings. For example, in a food store, multiple television monitors are often located around the store at different food departments. In such circumstances, it would be desirable to the store if commercials regarding the store were substituted for alternate commercials having nothing to do with the store (or having to do with other food stores). Moreover, it would be particularly desirable if certain commercials tailored to particular food departments could be displayed on the respective television monitors for those respective food departments. This can be achieved by implementing multiple systems 100 at the multiple television sets throughout the store, thereby allowing for the selective display of different commercials at different television monitors where those commercials are particularly appropriate. Practically, this type of implementation would typically involve connecting a respective box (similar to a cable television box) or installing a respective card for each different television. The alternate commercials could be already loaded into the memories of the respective boxes when installed. However, more commonly, the information concerning alternate commercials would be loaded from CDs/DVDs, floppy disks, phone lines, the internet, networks, tapes/cartridges, and/or other sources into the systems 100 by way of the respective input/output devices 110 at each of the systems. In alternate embodiments, the information could be downloaded by way of a network such as the internet.

Although many embodiments of the present invention would employ individual downstream systems 100 at individual downstream locations (e.g., at respective televisions), in alternate configurations it would be desirable to implement one or more of the downstream system(s) at locations that were slightly upstream of the televisions. For example, in one alternate embodiment, multiple downstream systems 100 could be employed respectively to modify multiple television broadcast signals 14 (e.g., multiple channels). Such multiple television broadcast signals 14 could, for example, be provided by way of a cable line carrying multiple different signals for multiple different channels. By modifying these multiple television broadcast signals 14 upstream of the televisions, the modified television signals 118 could then be combined by way of a mixer (not shown) to again form an overall cable signal carrying multiple different signals for multiple different channels. Such an overall cable signal could in turn be provided to multiple televisions (rather than simply to an individual television at which an individual downstream system was located), allowing each of those multiple televisions to access multiple channels, each of which was modified to include alternate commercials. Such a system allowing for multiple television sets to receive multiple modified television signals, by way of the mixing of those multiple modified television signals, would be equally applicable with respect to the embodiment of FIG. 3.

Figure 5:
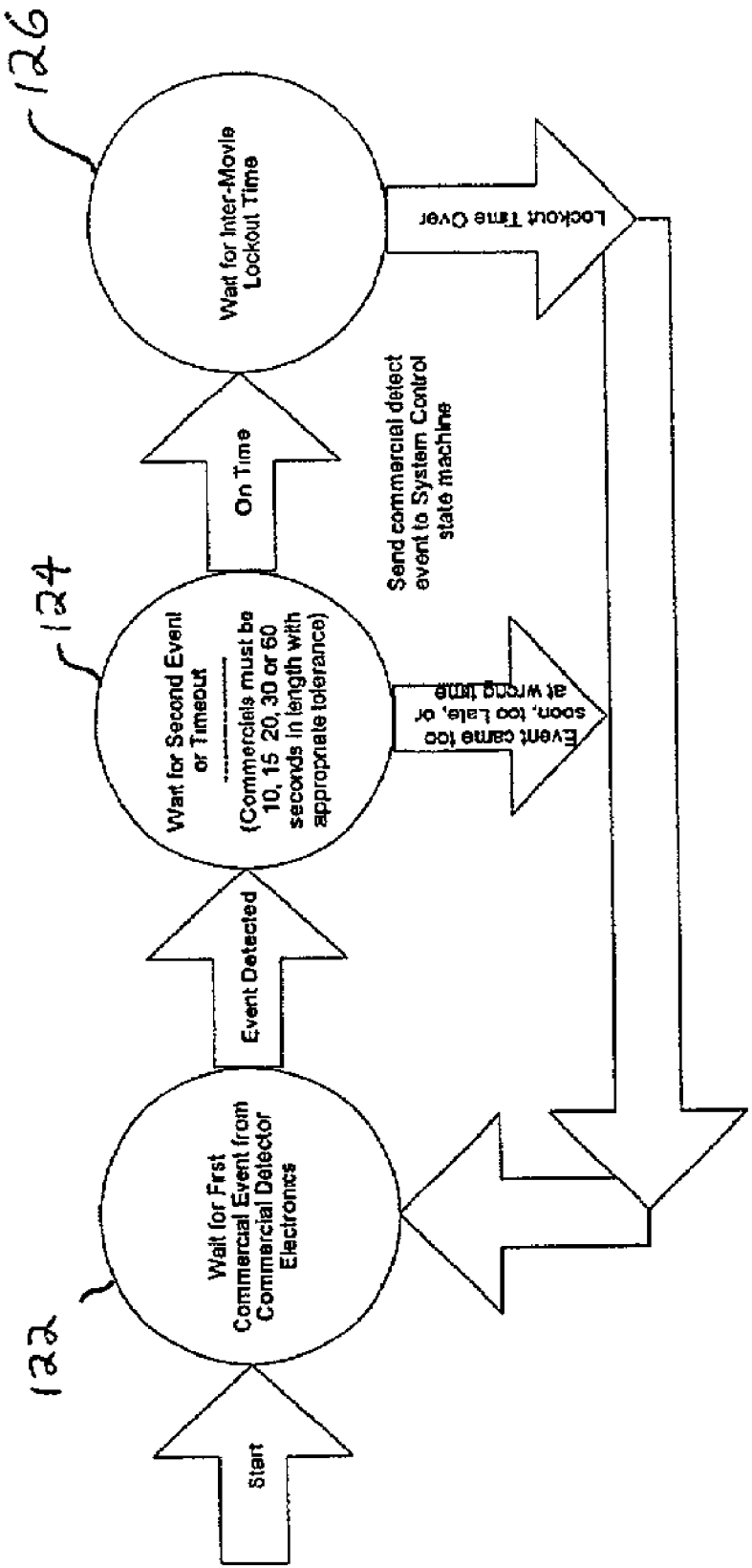
FIG. 5 is a state diagram showing exemplary steps of operation of the system of FIG. 4 concerning the detection of commercial signals within the television broadcast signal.

Turning to FIG. 5 exemplary states of operation of the controller 106 for the system 100 of FIG. 4 are shown. Upon starting operation, the controller 106 is in a first state 122 in which the controller is waiting for a first video and audio blank period (e.g., the blank period 50a) to be detected by the detection circuit 104. Such detection signifies that a first commercial signal 40a may be occurring within the television broadcast signal 14. Upon such blank period being detected, a timer is activated and the controller 106 awaits the detection of a second blank period (e.g., the blank period 50b) by the detection circuit 104. The timer can be a discrete component associated with the controller 106 or implemented by way of software. The controller 106 remains in the state 124 until another blank period is detected. If such blank period is detected at a time other than at a time that is 10, 15, 20, 30 or 60 seconds after the first detected blank period, the controller 106 returns to the state 122. However, if the second blank period is detected to have occurred at any of the 10, 15, 20, 30 or 60 second points after the first blank period, the controller 106 enters a state 126 at which the controller 106 commences the substitution of an alternate commercial message into the television broadcast signal 14 to produce the modified television signal 118. The controller 106 then remains in the state 126 until the playing of the alternate commercial signal has been completed. At this time, the controller 106 returns to the state 122. In alternate embodiments, the timer can be employed simply to determine one or more times at which specific alternate commercial messages should be aired rather than to determine the difference in time between successive blank periods. Such usage of the time would be particularly effective in circumstances in which the schedule of the television broadcast signal 14 is known beforehand with certainty, or where the controller 106 includes a buffer (as discussed above).

Figure 6:
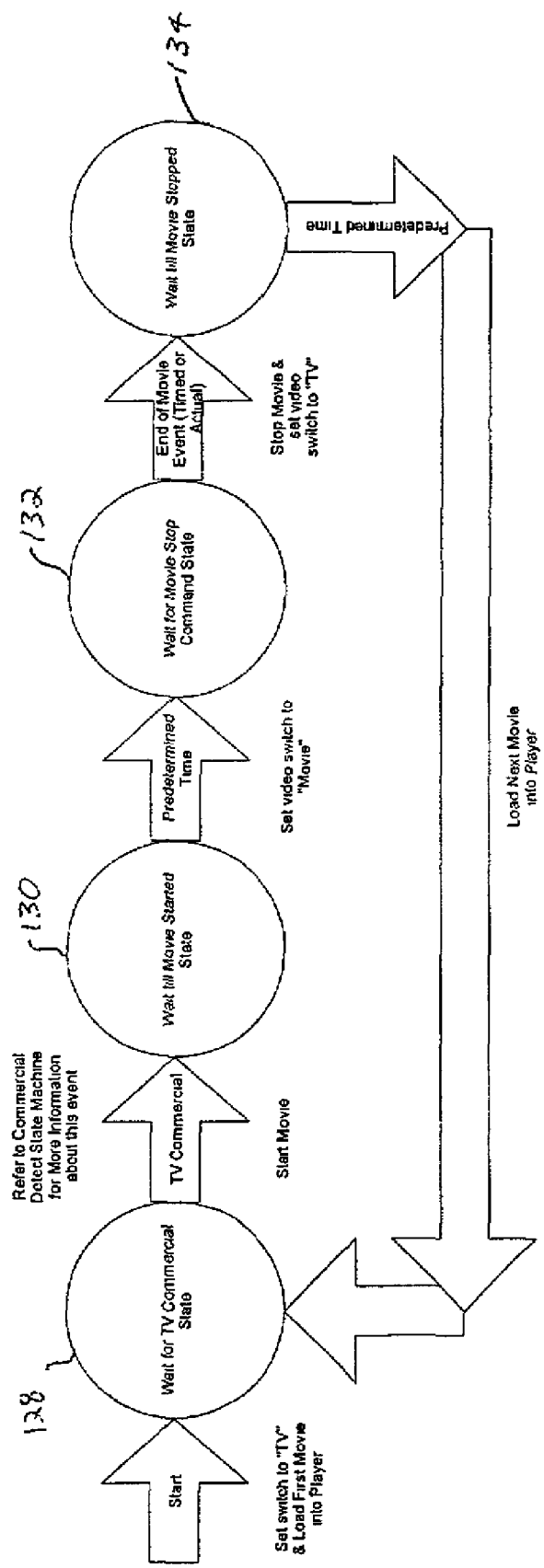
FIG. 6 is a state diagram showing exemplary steps of operation of the system of FIG. 4 concerning the substituting of alternate commercial signals in place of the original commercial signals.

Turning to FIG. 6, additional exemplary states of operation of the controller 106 relating to the controller's substitution of alternate commercial signals for existing commercial signals (by controlling the signal processing device 116) are shown. At times other than when the controller 106 has detected two successive video and audio blank periods separated by one of the standard commercial time lengths, the controller 106 is in a state 128 in which it is waiting for an opportunity to substitute an alternate commercial signal in place of an existing commercial signal. Upon the controller 106 entering the state 126, at which the controller has determined that it is appropriate to substitute an alternate commercial signal in place of an existing commercial signal, the controller 106 enters another state 130, in which it obtains information necessary for substituting an alternate commercial signal for an existing commercial signal. This information can be obtained from the memory device 108, the input/output device 110 or another source. Once the necessary information has been obtained, the controller 106 provides a control signal 114 causing the signal processing device 116 to begin to substitute the alternate commercial signal for the existing commercial signal. The controller 106 then enters a state 132 in which the alternate commercial signal is being substituted for the existing commercial signal. Finally, upon the completion of the substituting of the alternate commercial signal, the controller 106 provides the control signals 114 to the switching device 116 causing the switching device to switch so that the modified television signal 118 is again identical to the television broadcast signal 14. Until the alternate commercial signal is completely stopped, the controller 106 remains in a state 134, after which it returns to the state 128 and also to the state 122.

While the foregoing specification illustrates and describes the preferred embodiments of this invention, it is to be understood that the invention is not limited to the precise construction herein disclosed. The invention can be embodied in other specific forms without departing from the spirit or essential attributes of the invention. Numerous modifications to the design of systems 60, 80 and 100 are intended to be encompassed within the present invention. For example, in alternate embodiments, the controller 88 of the downstream system 80 could also be in communication with an input/output device. Also, each of the systems 60, 80, & 100 could be in communication with other networks such as the internet. Accordingly, reference should be made to the following claims, rather than to the foregoing specification, as indicating the scope of the invention.

What is claimed is:

1. A system for modifying a first television signal to produce a second television signal that is displayed by a video display unit upon being received by the video display unit, the system comprising:

a plurality of displays in a locale, each display having a video input;

a memory unit that stores information corresponding to an alternate television commercial signal;

a control unit that is coupled to the memory unit and receives the first television signal, the control unit comprising an output connected to the inputs of the plurality of displays;

wherein the first television signal includes at least, during a first time period, a television program signal and, during subsequent time periods, a first commercial signal and a second commercial signal;

wherein, upon a first condition being met, the control unit substitutes the alternate commercial signal based upon the stored information for at least one of the first and second commercial signals to produce a second television signal;

wherein the control unit substitutes the alternate commercial signal for the second commercial signal;

wherein the alternate commercial signal includes display information specific to the locale; and wherein the first condition is detection of at least one blank period within the first television signal by the control unit, wherein video and audio are in a neutral state during the at least one blank period.

2. The system of claim 1, wherein the control unit includes a timer, and wherein the control unit determines that the first condition has been met by:

monitoring the first television broadcast signal for a first of the blank periods;

determining that an additional one of the blank periods occurs upon the passing of a predetermined time interval after the first of the blank periods as measured by the timer.

3. The system of claim 2, wherein the predetermined time interval is selected from the group consisting of ten seconds, fifteen seconds, twenty seconds, thirty seconds, one minute.

4. The system of claim 1, wherein the memory unit stores video information corresponding to a plurality of additional alternate television commercials.

5. The system of claim 1, wherein the first television signal includes a plurality of additional television program signals at a plurality of additional television program times, and further includes a plurality of additional commercial signals at a plurality of additional commercial times, and wherein the television program signals alternate with a series of the additional commercial signals.

6. The system of claim 5, wherein the control unit substitutes a plurality of different alternate commercial signals for at least some of the additional commercial signals.

7. The system of claim 6, wherein the control unit determines which of the plurality of different alternate commercial signals to substitute for a given one of the plurality of additional commercial signals based upon at least one of a current time as determined by the timer, a current sequence, a command received by the control unit, and another defined control state.

8. The system of claim 1, wherein during the at least one blank period the first television broadcast signal is devoid of audio and video content.

9. The system of claim 1, wherein the system is at least one of configured for physical attachment to the video display unit, which is a television, and configured for coupling to the video display unit by way of an additional device, wherein the additional device is one of a mixer and another device.

10. The system of claim 1, wherein the memory unit is selected from the group consisting of a CD-Rom drive, a DVD drive, a floppy disk drive, a hard drive, a tape cassette player, and an alternate storage device.

11. The system of claim 1, wherein the control unit includes a signal switching unit, wherein the second television signal is produced by switching off the at least one commercial signal and switching on the alternate commercial signal.

12. The system of claim 1, wherein the control unit includes a buffer in which the control unit stores a segment of the first television broadcast signal upon receiving that segment; so that the control unit is able to analyze the segment prior to substituting the alternate commercial signal for at least one of the first and second commercial signals, and wherein the second television signal is delayed with respect to the first television signal.

13. A system for modifying a first television signal to produce a second television signal that is displayed by a video display unit upon being received by the video display unit, the system comprising:

a plurality of displays in a locale, each display having a video input;

a memory unit that stores information corresponding to an alternate television commercial signal;

a control unit that is coupled to the memory unit and receives the first television signal, the control unit comprising an output connected to the inputs of the plurality of displays;

wherein the first television signal includes at least, during a first time period, a television program signal and, during subsequent time periods, a first commercial signal and a second commercial signal;

wherein, upon a first condition being met, the control unit substitutes the alternate commercial signal based upon the stored information for at least one of the first and second commercial signals to produce the second television signal;

wherein the alternate commercial signal includes display information specific to the locale; and wherein the control unit includes a buffer in which the control unit stores a segment of the first television broadcast signal upon receiving that segment; so that the control unit is able to analyze the segment for at least one of the first and second commercial signals prior to substituting the alternate commercial signal, and wherein the second television signal is delayed with respect to the first television signal.

14. A method of modifying a first television broadcast signal to produce at least one second television signal, the method comprising:

receiving a first television signal from a broadcasting source, wherein the first television broadcast signal includes a plurality of information signals including at least one program signal and at least one commercial signal;

monitoring the first television signal for a detectable event within the first television signal, wherein the detectable event occurs after the at least one commercial signal;

substituting an alternate commercial signal for at least one other commercial signal to produce a second television signal on a plurality of displays in a locale when the detectable event is detected from the monitored first television signal, wherein the alternate commercial signal includes display information specific to the locale; and outputting the second television signal.

15. The method of claim 14, wherein the detectable event is a second blank period within the first television signal, and wherein the method includes:

monitoring the first television signal for a first blank period within the first television broadcast signal occurring before the at least one commercial signal;

determining whether a time period between the first and second blank periods is a standard time period;

wherein, upon a determination that the time period is a standard time period, the alternate commercial signal is substituted for the at least one other commercial signal that occurs immediately after the second blank period.

16. A video display apparatus comprising:

at least one display having a video input;

a switch having a first input connected to receive a first video signal, a second input connected to receive a second video signal, and an output connected to the video input of the at least one display;

a detection device connected to monitor the first video signal and configured to identify detectable events of the first video signal, the detectable events comprising blank periods absent video or audio information;

a controller configured to control the switch to selectively transmit the first video signal and the second video signal, based upon identified detectable events of the first video signal; and wherein the at least one display includes a number of displays in a locale and the second video signal includes display information specific to the locale.

17. The video display apparatus of claim 16 wherein the first video signal is a broadcast television signal and wherein the detection device is further configured to identify commercial periods of the broadcast television signal.

18. The video display apparatus of claim 16 wherein the controller includes at least one of a memory device having the second video signal stored thereon and a network connection to receive the second video signal.

19. The video display apparatus of claim 18 wherein the controller is programmed to output the second video signal to the at least one display via the switch in association with an identified detectable event.

20. The video display apparatus of claim 16 wherein the controller is programmed to automatically determine a standard blanking period length from identified detectable events of the detection device.

21. A method for configuring a video system to display user-selectable video signals:

receiving a first video signal into a local region;

connecting a monitoring device to the first video signal to identify commercial events of the first video signal;

receiving at least one user-selected second video signal; and configuring a switch to output the first video signal during non-commercial events and output the at least one user-selected second video signal during at least one commercial event of the first video signal;

connecting the switch to at least one display in the local region, wherein the at least one display includes a number of displays and the at least one user-selected second video includes display information specific to the local region; and wherein connecting the monitoring device to the first video signal includes configuring the monitoring device to identify commercial events by detecting blank periods of the first video signal, wherein the blank periods do not comprise video and audio information.

22. The method of claim 21 wherein configuring the switch includes gating the switch with a controller.

23. The method of claim 22 further comprising programming the controller to automatically determine a commercial event timing of the first video signal, based upon commercial events identified by the monitoring device.

24. The method of claim 23 further comprising programming the controller to avoid switching the switch to the at least one user-selected second video signal during non-commercial events of the first video signal.

25. The method of claim 21 wherein receiving the at least one user-selected second video signal includes at least one of receiving alternate commercials and receiving locally-relevant information.

26. The method of claim 21 further comprising configuring the switch to output the at least one user-selected second video signal during a second or subsequent commercial event of the first video signal.

27. A signal interruption system comprising:

a video input connected to receive a broadcast signal;

a detection device connected to the video input and configured to monitor the broadcast signal for blank periods in which the broadcast signals are in a black, default, or neutral state;

a memory unit connected to receive and store at least one user-selected alternate video signal via at least one of a memory device and a computer network connection;

a switch configured to control a video feed to at least one display, the switch connected to receive the broadcast signal and the alternate signal, wherein the at least one display includes a number of displays in a locale and the at least one user-selected alternate video includes display information specific to the locale; and a controller connected to the detection device and configured to identify a period of time between a pair of the blank periods, wherein the control system is configured to control the switch to substitute the at least one user-selected alternate video signal for the broadcast signal in the video feed if the period of time between the pair of blank periods corresponds to a commercial time period.

* * * * *